(12) United States Patent
Romanofsky

(10) Patent No.: US 10,862,189 B1
(45) Date of Patent: Dec. 8, 2020

(54) NEAR EARTH AND DEEP SPACE COMMUNICATIONS SYSTEM

(71) Applicant: United States of America as represented by the Administrator of NASA, Washington, DC (US)

(72) Inventor: Robert R. Romanofsky, Hinckley, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 418 days.

(21) Appl. No.: 15/804,374

(22) Filed: Nov. 6, 2017

Related U.S. Application Data

(60) Provisional application No. 62/420,293, filed on Nov. 10, 2016.

(51) Int. Cl.
| | | |
|---|---|---|
| *H01Q 1/22* | (2006.01) | |
| *H01Q 1/27* | (2006.01) | |
| *G02B 17/06* | (2006.01) | |
| *G02B 23/06* | (2006.01) | |
| *G02B 23/16* | (2006.01) | |
| *H01Q 19/10* | (2006.01) | |

(52) U.S. Cl.
CPC ............. *H01Q 1/22* (2013.01); *G02B 17/061* (2013.01); *G02B 23/06* (2013.01); *G02B 23/16* (2013.01); *H01Q 1/27* (2013.01); *H01Q 19/10* (2013.01)

(58) Field of Classification Search
CPC ........... H01Q 1/22; H01Q 1/27; H01Q 19/10; H01Q 1/08; H01Q 1/12; H01Q 1/18; G02B 23/16; G02B 23/06; G02B 17/061
See application file for complete search history.

(56) References Cited

U.S. PATENT DOCUMENTS

| | | | | | |
|---|---|---|---|---|---|
| 3,164,835 | A | * | 1/1965 | Alsberg ................. | H01Q 19/19 343/779 |
| 3,331,072 | A | * | 7/1967 | Pease ..................... | H01Q 19/19 342/423 |
| 3,392,398 | A | * | 7/1968 | Bowditch ............... | H01Q 3/08 343/765 |
| 4,070,678 | A | * | 1/1978 | Smedes ................... | H01Q 3/20 343/754 |

(Continued)

FOREIGN PATENT DOCUMENTS

| | | | | | |
|---|---|---|---|---|---|
| CN | 201038321 | Y | * | 3/2008 | ............. H01Q 15/14 |
| CN | 201038322 | Y | * | 3/2008 | ............. H01Q 15/14 |

OTHER PUBLICATIONS

Tayabaly, K. (Light-weighted telescope mirrors: Outstanding properties of Silicon Carbide, Tutorial Opti521, Dec. 5, 2011).PDF. (Year: 2011).*

*Primary Examiner* — Dimary S Lopez Cruz
*Assistant Examiner* — Bamidele A Jegede
(74) *Attorney, Agent, or Firm* — Robert H. Earp, III; Mark Wolfgang; Helen M. Galus

(57) ABSTRACT

An apparatus that combines an antenna and telescope to minimize system mass without compromising performance of either the antenna or telescope. The apparatus includes a sub-reflector placed before a prime focus feed of a hybrid reflector system. The apparatus also includes a radio frequency (RF) reflector is rigidly attached to a body of a spacecraft and an optical section is attached to a vibration isolation platform.

17 Claims, 16 Drawing Sheets

(56) References Cited

U.S. PATENT DOCUMENTS

| | | | |
|---|---|---|---|
| 4,282,527 A | 8/1981 | Winderman et al. | |
| 4,804,972 A * | 2/1989 | Schudel | H01Q 1/42 343/840 |
| 4,950,063 A * | 8/1990 | Pohle | G02B 7/183 250/201.1 |
| 5,107,369 A * | 4/1992 | Hendrickson | G01S 7/4812 250/203.1 |
| 5,214,438 A * | 5/1993 | Brusgard | F41G 7/008 343/725 |
| 5,298,909 A * | 3/1994 | Peters | G01S 13/86 342/53 |
| 5,898,529 A * | 4/1999 | Meyer | G02B 23/00 343/781 P |
| 5,995,056 A * | 11/1999 | Ho | H01Q 13/08 343/779 |
| 6,445,351 B1 * | 9/2002 | Baker | H01Q 1/22 343/725 |
| 6,535,177 B1 * | 3/2003 | Dhellemmes | H01Q 1/084 343/765 |
| 6,674,576 B1 * | 1/2004 | Carollo | G02B 17/0605 359/485.02 |
| 7,346,281 B2 | 3/2008 | Wilcken et al. | |
| 7,782,530 B1 * | 8/2010 | Krumel | G02B 17/061 343/915 |
| 7,786,418 B2 | 8/2010 | Taylor et al. | |
| 8,094,081 B1 | 1/2012 | Bruzzi et al. | |
| 8,712,246 B2 | 4/2014 | Ruggiero et al. | |
| 2002/0008670 A1 * | 1/2002 | Sharman | H01Q 1/42 343/840 |
| 2002/0063657 A1 * | 5/2002 | Shuch | H01Q 3/26 342/362 |
| 2003/0193014 A1 * | 10/2003 | Honma | H01Q 3/08 250/227.14 |
| 2006/0290585 A1 * | 12/2006 | Welch | H01Q 19/021 343/781 CA |
| 2009/0009411 A1 * | 1/2009 | Catalani | H01Q 1/28 343/705 |
| 2010/0127113 A1 * | 5/2010 | Taylor | F41G 7/008 244/3.16 |
| 2011/0012801 A1 * | 1/2011 | Monte | H01Q 1/288 343/762 |
| 2011/0097089 A1 | 4/2011 | Hunt | |
| 2011/0187627 A1 * | 8/2011 | Palmer | H01Q 15/161 343/915 |
| 2011/0262145 A1 * | 10/2011 | Ruggiero | H01Q 15/0033 398/115 |
| 2011/0309991 A1 * | 12/2011 | Catalani | H01Q 19/193 343/837 |
| 2012/0002973 A1 * | 1/2012 | Bruzzi | H01Q 13/0208 398/116 |
| 2013/0057651 A1 * | 3/2013 | Ueland | H01Q 1/125 348/46 |
| 2015/0194733 A1 * | 7/2015 | Mobrem | H01Q 15/168 343/915 |
| 2017/0093483 A1 * | 3/2017 | Goodzeit | B64G 1/503 |

\* cited by examiner

500

800

1000

1100

1200

1300

1400

1600

NEAR EARTH AND DEEP SPACE COMMUNICATIONS SYSTEM

CROSS-REFERENCE TO RELATED APPLICATION

This application claims the benefit of U.S. Provisional Patent Application No. 62/420,293, filed on Nov. 10, 2016. The subject matter thereof is hereby incorporated herein by reference in its entirety.

ORIGIN OF THE INVENTION

The invention described herein was made by an employee of the United States Government and may be manufactured and used by or for the Government for Government purposes without the payment of any royalties thereon or therefore.

FIELD

The present invention relates to a telescope and antenna system, and more particularly, to a hybrid telescope antenna system.

BACKGROUND

Deep space optical communications technology has been under development for several decades now. However, operational systems fail to exist. Recently, the lunar laser communication demonstration returned data from the moon at an unprecedented 622 MBPS. Optical communications have not been demonstrated from Deep-space, and mission planners are being reluctant to accept associated risks.

As science instrumentation becomes more sophisticated and data richness increases (e.g., hyper-spectral imagers, studio quality video, etc.), demand for higher and higher data rates can only increase. Technical linchpins include improving laser efficiency and achieving pointing and tracking requirements, insensitive to spacecraft disturbances. A Ka-band back-up system could be used during periods when site diversity alone is inadequate to fulfill mission requirements. A hybrid system is also attractive because of long periods of solar obscuration for an optical only system. A typical deep-space optical link cannot work within a sun-Earth-probe angle less than about three degrees, whereas a microwave link can operate within one degree. Ka-band provides an additional 15 to 20 days of coverage annually over an optical-only system.

Thus, an alternative hybrid telescope-antenna system may be beneficial.

SUMMARY

Certain embodiments of the present invention may provide solutions to the problems and needs in the art that have not yet been fully identified, appreciated, or solved by current optical communications systems. For example, some embodiments generally pertain to a hybrid telescope antenna (teletenna) system.

In an embodiment, apparatus that combines an antenna and telescope to minimize system mass without compromising performance of either the antenna or telescope. The apparatus includes a sub-reflector placed before a prime focus feed of a hybrid reflector system. The apparatus also includes a radio frequency (RF) reflector is rigidly attached to a body of a spacecraft and an optical section is attached to a vibration isolation platform.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a tele-antenna (or "teletenna") that combines an antenna and telescope to minimize system mass without compromising performance of either the antenna or telescope. In certain embodiments, teletenna blurs the physical distinction between the telescope and the antenna, and the microwave and optical signal are co-boresighted for beam steering purposes.

Existing hybrid systems, such as Risley prisms, have a ratio of antenna area to telescope area near unity. Teletenna may address systems where that ratio is on the order of a 100. Teletenna may use a classical Cassegrain geometry modified to accommodate a virtual prime focus feed and optical sub-reflector. In some embodiments, the sub-reflector, such as optical sub-reflector 104, is placed before the prime focus feed, such as RF feed 102, of the hybrid reflector system, and acts as a mirror for the optical signal. The sub-reflector, however, must be transparent to microwave radiation in some embodiments. The phase center of the feed horn is placed at the virtual focus of the Cassegrain reflector. An RF reflector may be rigidly attached to the spacecraft body, while the optical section is attached to a vibration isolation platform. The teletenna supports precision beaconless pointing through sensor fusion and platform stabilization.

Teletenna features an f/D (focal length-to-diameter) ratio optimized to minimize mass; a mesh aerial density <0.8 kg/m$^2$ and a composite mirror density <4 kg/m$^2$ (this represents less than half the mass of the Mars Reconnaissance Orbiter 3 m composite dish); a RF section thermally and mechanically isolated from the optics section; optical beam divergence that accommodates star tracker based beaconless pointing; an RF transparent optical sub-reflector to minimize RF blockage; a novel sub-reflector support tube material to minimize RF blockage; and a custom integrated strut/waveguide to couple amplifier power to the RF feed as a further improvement to minimize system mass.

Figure 1:
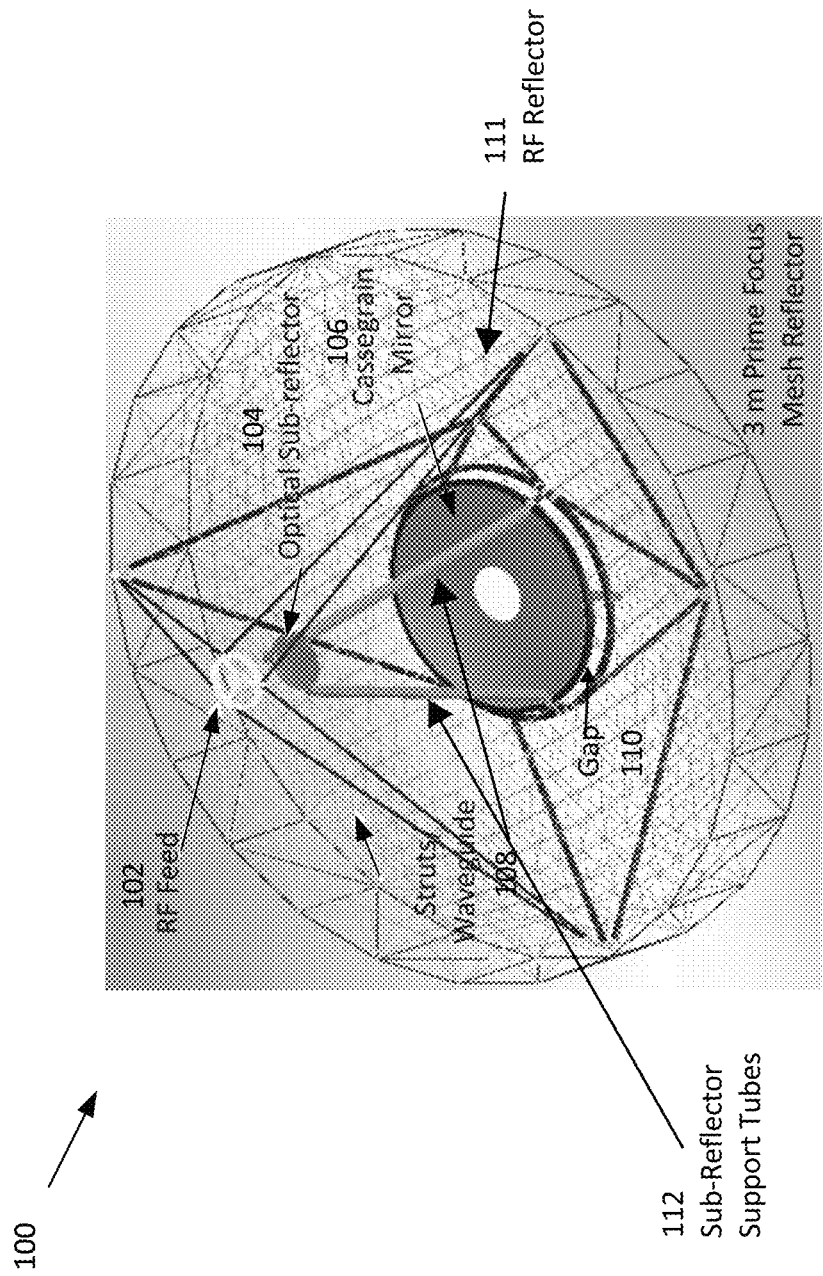
FIG. 1 is a diagram illustrating a teletenna, according to an embodiment of the present invention.

FIG. 1 is a diagram illustrating a teletenna 100, according to an embodiment of the present invention. Teletenna 100 includes a RF feed 102, an optical sub-reflector 104, a mirror 106 (labelled "Cassegrain Mirror"), which serves as an optical reflector, struts 108, and a gap 110. In some embodiments, an RF reflector 111, also referred herein as an RF primary reflector, with preferred f/D ratio and feed 102 are located at the focal point and supported by struts (one of which also serves as a waveguide transmission line) 108. A separate mirror, such as mirror 106, may be co-located around the vertex of the RF primary reflector 111 and essentially following the same optical prescription. An RF transparent optical sub-reflector 104 is optimally located between the vertex and a prime focus feed (such as RF feed 102). Mirror 106 is not physically attached to the RF reflector 111 in some embodiments. Mirror 106 (and sub-reflector support tubes 112 and optical sub-reflector 104) are attached to a vibration isolation platform located under mirror (not shown) within the inner perimeter of the gap 10. The RF reflector, struts 108 RF reflector and RF feed 102 are attached directly to the spacecraft deck.

Mass Minimization

The major contributors to mass for a parabolic reflector are the actual RF reflector material and the struts to support the RF feed. For a given RF reflector diameter, the deeper the RF reflector (i.e., the lower the f/D ratio), the more material, which results in greater mass. However, when the reflector is shallower, the RF feed is located further from the vertex, and the struts to support the RF feed eventually outweigh the RF reflector.

Figure 2:
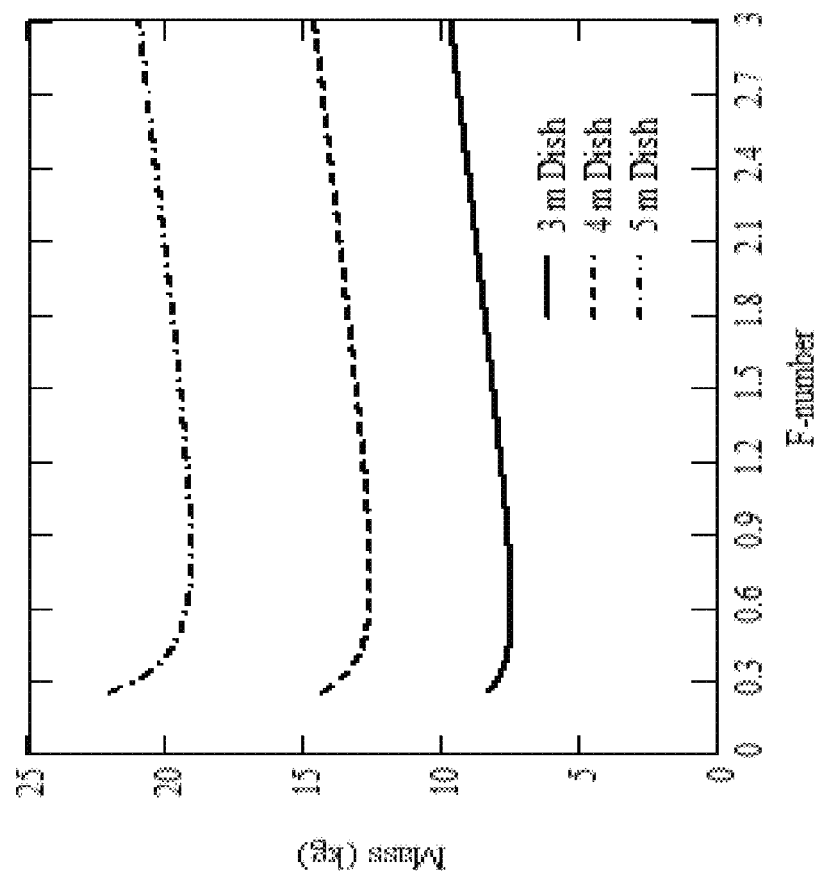
FIG. 2 is a graph illustrating the calculated RF reflector mass as a function of f/D (F-number), according to an embodiment of the present invention.

To minimize system mass, there is generally an optimal f/D ratio. FIG. 2 is a graph 200 illustrating the calculated RF reflector mass as a function of f/D (F-number) illustrating optimal f/D to minimize system mass, according to an embodiment of the present invention. As the analysis indicates, there is broad minima between an F # of approximately 0.35 to 0.5. This is the recommended prescription range to minimize mass.

Telescope Support Tube Blockage Analysis

Figure 3:
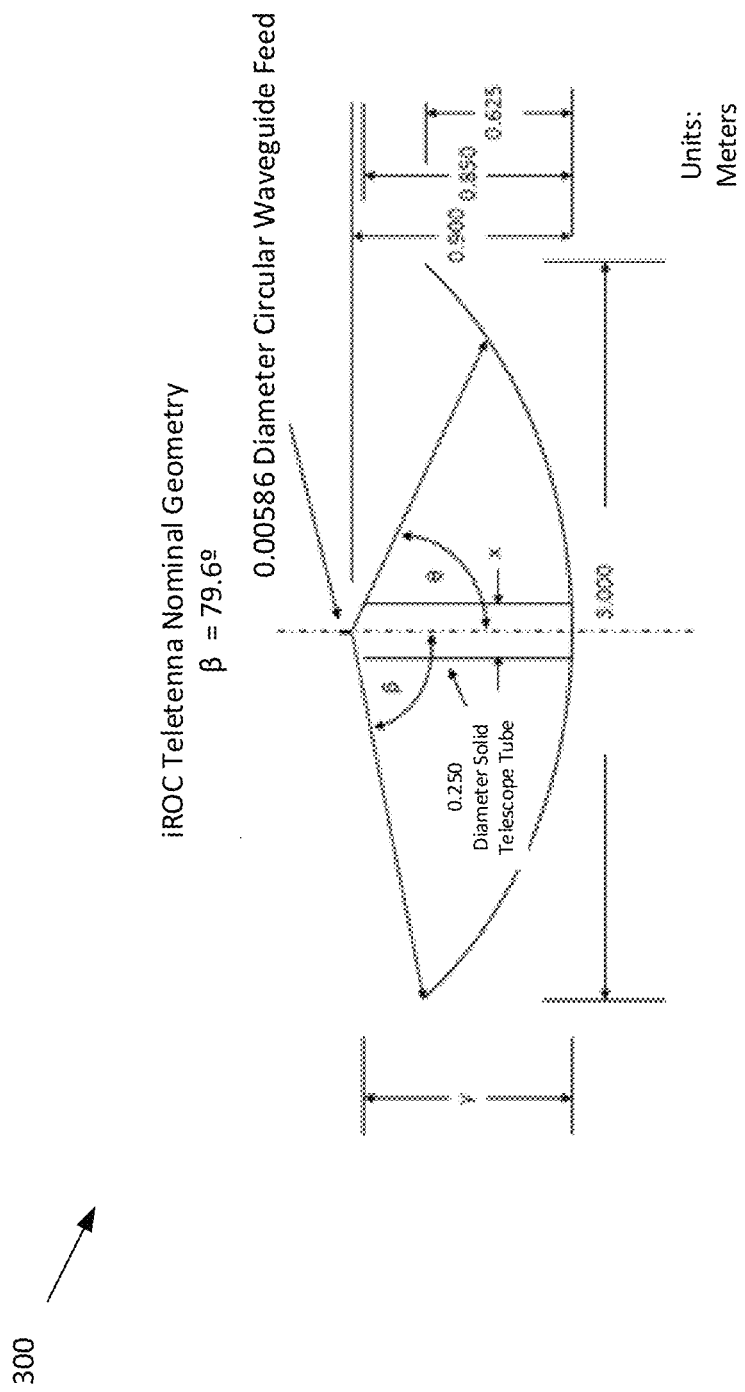
FIG. 3 is a diagram illustrating the geometry used for telescope tube RF blockage analysis, according to an embodiment of the present invention.

Without telescope support tube obscuration, the maximum theoretical directivity for a 3 meter RF reflector is ≈60.0 dB. Further, the maximum achievable directivity is 59.1 dB based on trade-offs between aperture illumination efficiency and radiation spillover efficiency. The analysis presented below may use an open-ended circular waveguide feed to calculate the radiation pattern. In this example, the waveguide radius is approximately 0.293 cm. FIG. 3 is a diagram 300 illustrating the geometry used for telescope tube RF blockage analysis, according to an embodiment of the present invention.

Figure 4:
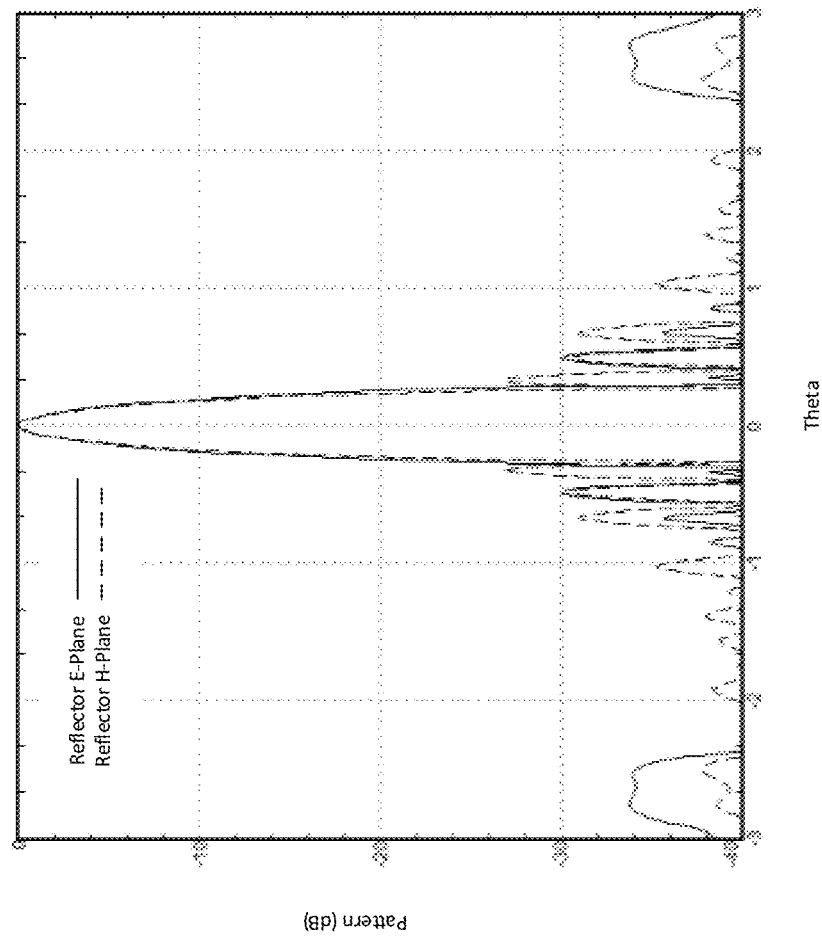
FIGS. 4-6 are graphs illustrating how the sub-reflector support tube affects RF performance (i.e., efficiency) as a function of tube RF opacity, according to an embodiment of the present invention.
Figure 5:
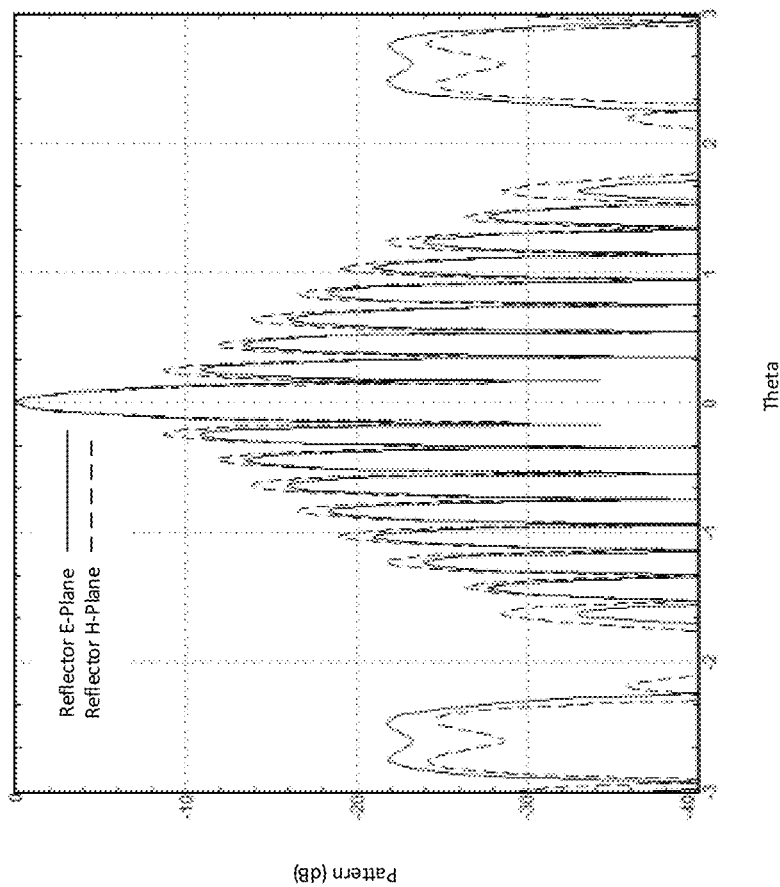
Figure 6:
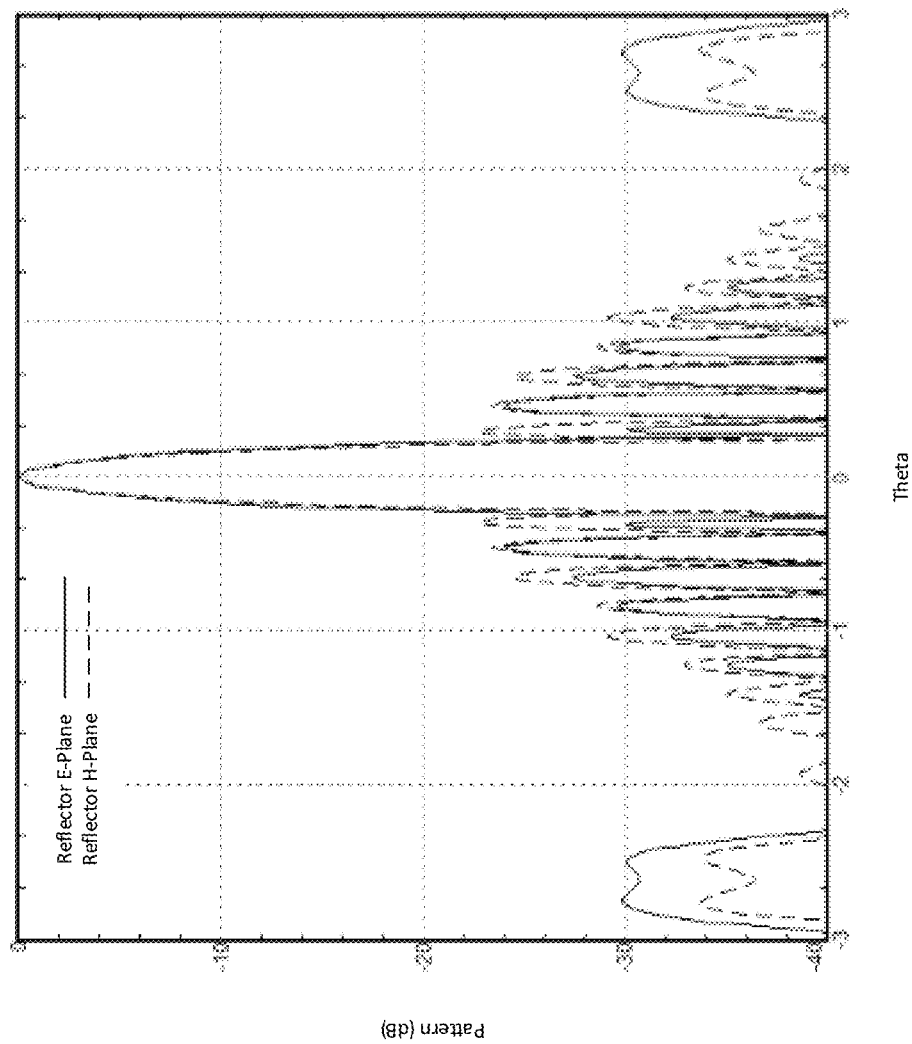
Figure 6:

FIGS. 4-6 are graphs 400-600 illustrating how the sub-reflector support tube affects RF performance (i.e., efficiency) as a function of tube RF opacity, according to an embodiment of the present invention. In FIG. 4, graph 400 shows an antenna pattern with no blockage (x=0) and λ/30 RMS surface roughness. In this example, directivity is 58.2 dBi and efficiency=65.9%. In FIG. 5, graph 500 shows λ/30 RMS surface roughness with 30 dB tube attenuation (conventional SiC Solid tube). In this example, directivity=53.2 dBi and efficiency=20.8%. In FIG. 6, graph 600 shows that y=85 cm x=25 cm, λ/30 RMS surface roughness, 6 dB tube attenuation, directivity=58.1 dBi, and efficiency=64.4%.

Simply put, a sub-reflector support tube with preferred geometry (e.g., 5 cm from the RF feed for 25 cm diameter tube in this case) and a 6 dB insertion loss degrades efficiency only about 2%.

Transparent SiC for Teletenna Structures

SiC is the material of choice for the telescope support structure because of extremely high modulus, very high thermal conductivity, and very low thermal expansion coefficient. SiC is a semiconductor, and therefore, opaque to microwave radiation. However, conductivity is a sensitive function of dopant concentration and temperature. SiC is a semiconductor and its properties can theoretically be modified to become more dielectric-like, potentially leading to a formulation that is transparent at microwave frequencies.

Figure 7:
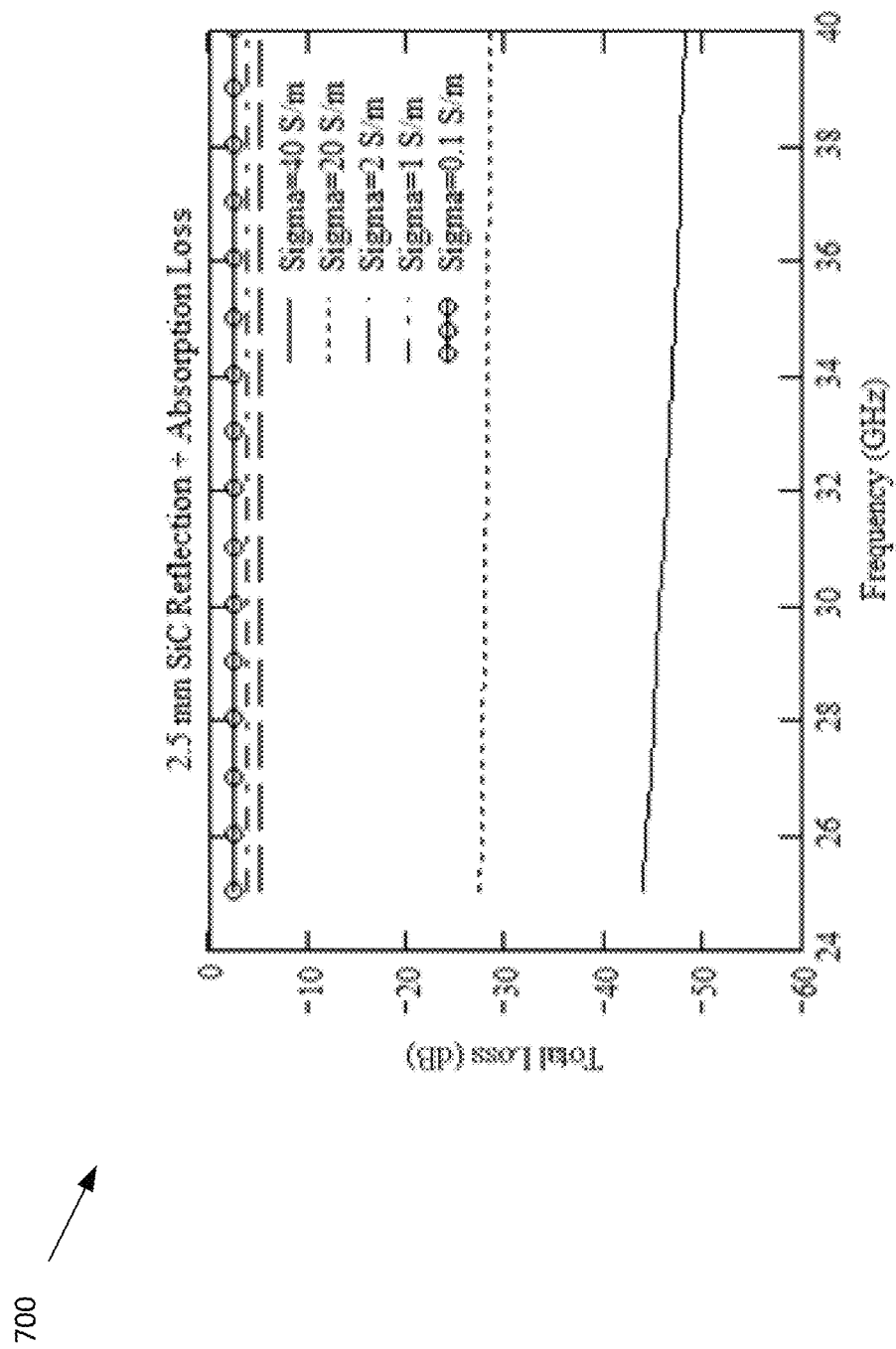
FIG. 7 is a graph illustrating calculated attenuation of a 2.5 mm thick slab of SiC, according to an embodiment of the present invention.

FIG. 7 is a graph 700 illustrating calculated attenuation of Ka-band radiation through 2.5 mm slab of SiC as a function of conductivity, according to an embodiment of the present invention. It should be noted that conventional structural SiC may have a conductivity around 20 S/m.

Figure 8:
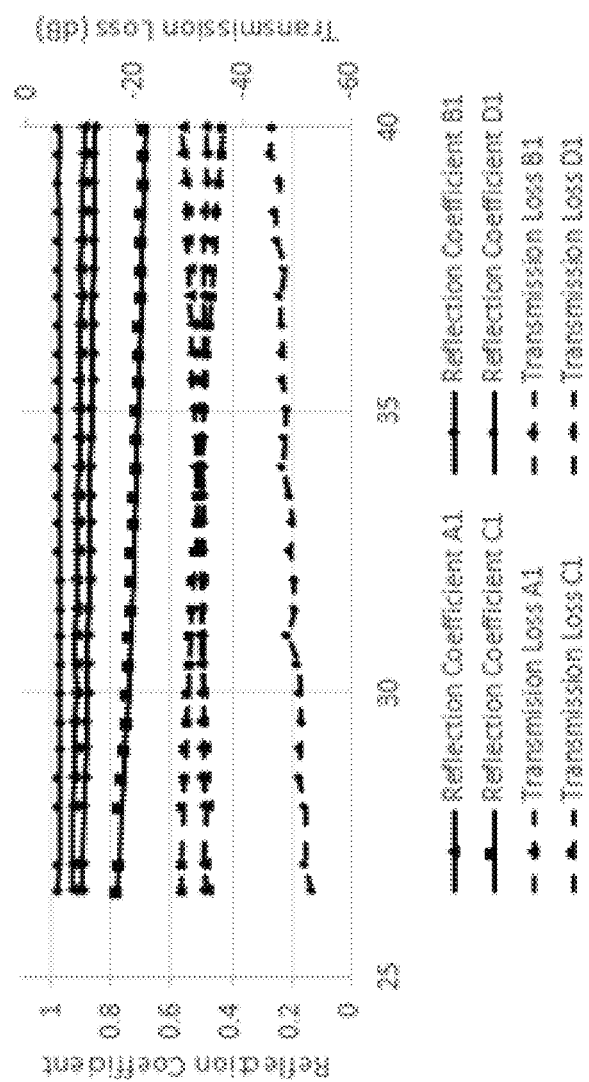
FIG. 8 is a graph illustrating measured reflection coefficient and transmission loss of four samples A1, B1, C1 and D1 at room temperature, according to an embodiment of the present invention.

FIG. 8 is a graph 800 illustrating measured reflection coefficient (primary axis, triangular markers) and transmission loss (secondary axis, round markers) of four samples A1, B1, C1 and D1 at room temperature (≈22 degrees C.), according to an embodiment of the present invention.

Figure 9:
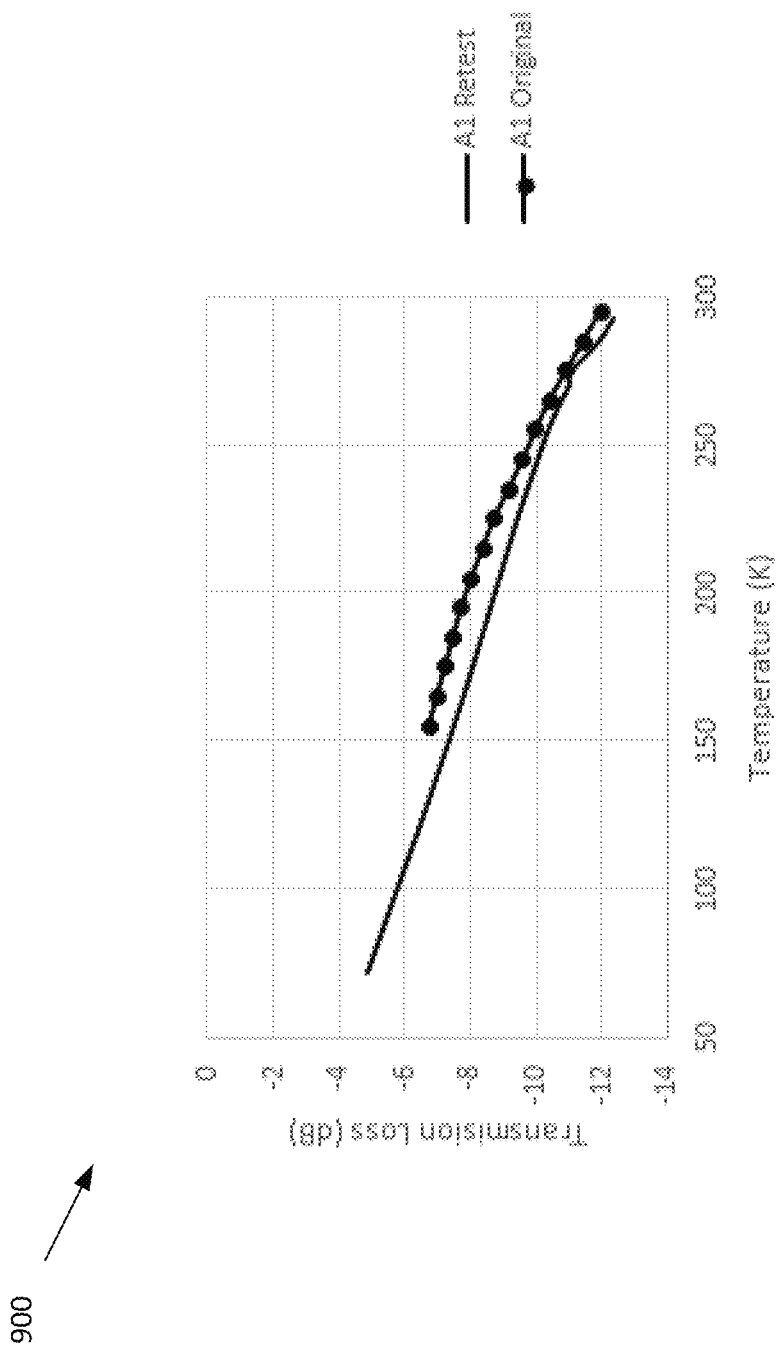
FIG. 9 is a graph illustrating measured insertion loss of an optimized sample, according to an embodiment of the present invention.

FIG. 9 is a graph 900 illustrating a measured insertion loss of an optimized sample, according to an embodiment of the present invention. In graph 900, the slight difference between measurements is due to some material damage as the sample is inserted and removed from the sample holder. One of ordinary skill in the art would appreciate the 25 to 30 dB improvement in transmission coefficient as compared to conventional SiC in FIG. 8.

Waveguide Analysis

Each RF feed support strut may contribute about 0.5 kg/m for a standard copper WR-28 waveguide, for example. Depending on the RF reflector diameter and f/D ratio, a typical strut may contribute 1 kg or more to the overall mass. In some embodiments, a customized waveguide section may be used as a structural support member, shaving a kg or more from the overall system mass.

Figure 10:
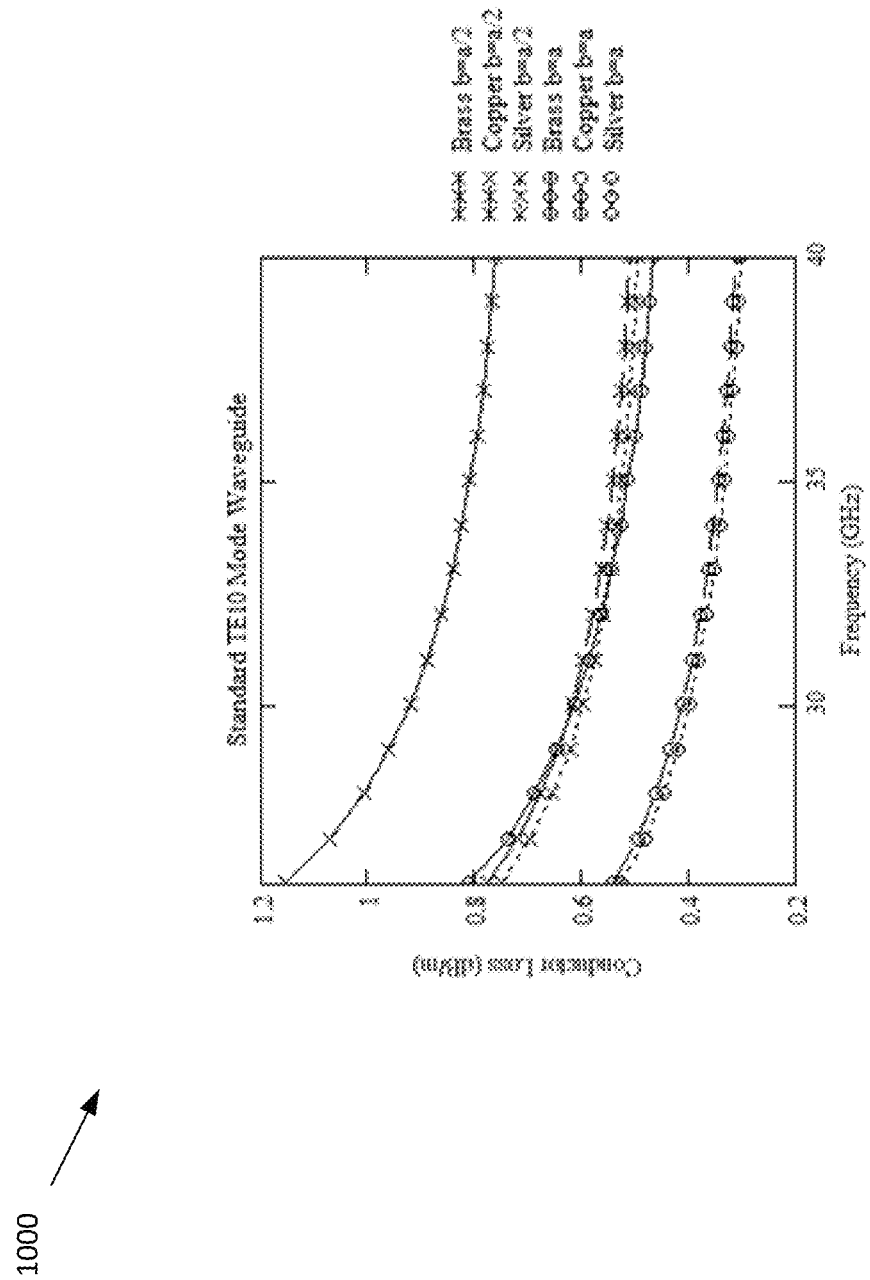
FIG. 10 is a graph illustrating insertion loss for a standard waveguide over the Ka-band, according to an embodiment of the present invention.
Figure 11:
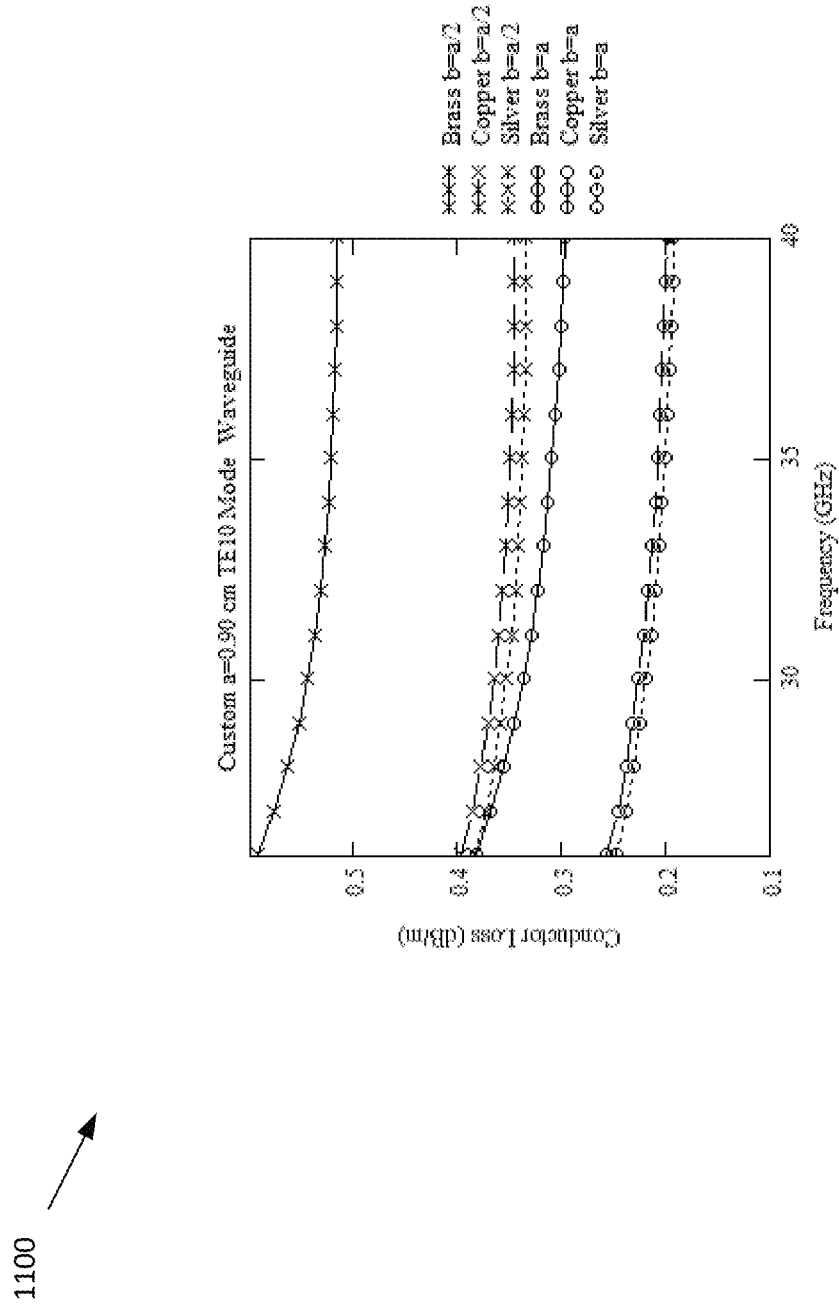
FIG. 11 is a graph illustrating insertion loss for customized waveguide over the Ka-band, according to an embodiment of the present invention.

FIG. 10 is a graph 1000 illustrating insertion loss for a standard WR-28 waveguide over the Ka-band with waveguide material as a parameter, according to an embodiment of the present invention. For standard copper guide, the loss at 30 GHz is about 0.6 dB/m (e.g., about 15% loss per meter). FIG. 11 is a graph 1100 illustrating insertion loss for a customized waveguide over the Ka-band with waveguide material as a parameter, according to an embodiment of the present invention. In graph 1000, for the optimized copper guide, the loss at 30 GHz is about 0.23 dB (about 5% loss per meter).

Telescope and Antenna Structural/Thermal Gap Analysis

Teletenna may support precision beaconless pointing by way of sensor fusion (e.g., star trackers and gyroscopes) and platform stabilization. In an embodiment, the antenna 3-dB beamwidth for a 3 meter RF reflector at 32 GHz is about 3500 microradians (>>1 Earth diameter at Mars apogee), and the beam divergence of a nominal 12 cm telescope is only about 13 microradians (<<1 Earth diameter at Mars apogee). The spacecraft integrated disturbance may exceed 100 microradians (>>telescope beam width). Thus, the telescope should isolate vibrations from the spacecraft, otherwise, pointing would be impossible.

Figure 12:
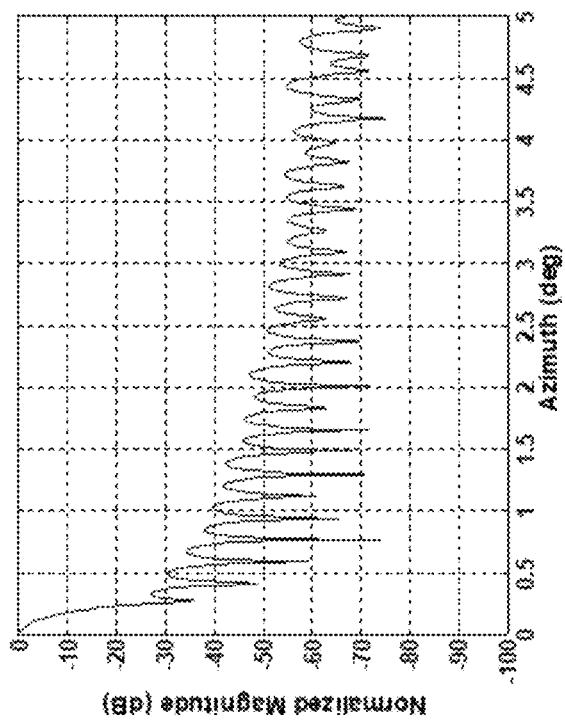
FIGS. 12-14 are graphs illustrating the effect of mirror-to-antenna gap separation, according to an embodiment of the present invention.
Figure 13:
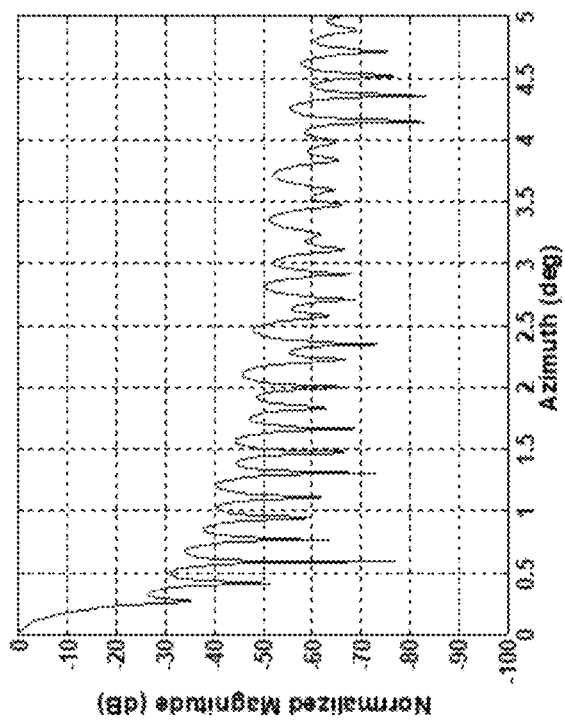
Figure 14:
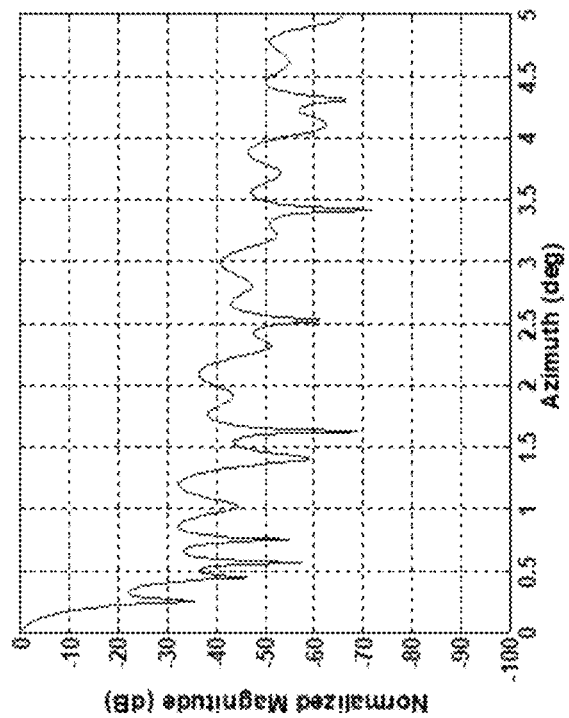

To enable this, the antenna and mirror are physically separated in some embodiments. The RF reflector, such as RF reflector 111 of FIG. 1, is rigidly attached to the spacecraft body, while the optical mirror (such as mirror 106 of FIG. 1), is attached to a vibration isolation platform behind mirror 106 and/or RF reflector 111. It should be noted however that the required gap between the mirror and RF reflector can degrade the RF efficiency and beam pattern. See, for example, FIGS. 12-14, which are graphs 1200-1400 illustrating the effect of mirror-to-antenna gap separation, according to an embodiment of the present invention. For this reason, the gap should be large enough to keep the inner rim of the RF reflector out of contact with the outer rim of the mirror in a high disturbance environment. It should be noted however that the gap should be small enough so as to not perturb the antenna beam and efficiency.

Based on the analysis shown in graphs 1200-1400, a gap much less than 10 wavelengths is desirable from an RF performance point of view. Thus, in some embodiments, the recommended gap size to provide comfortable structural isolation between the RF reflector and mirror is <2 to 3 wavelengths (k), or less than about 2 cm for a Ka-band system.

Prescription/Blockage Trade-Off

It should be noted that based on geometry there are obscuration (blockage) advantages should the optical sub-reflector be positioned as far as possible from the RF feed. Further, it may be desirable to have the mirror contribute to the RF pattern and overall antenna efficiency. This implies that the mirror may have to be the same prescription. However, when the sub-reflector moves towards the vertex, it must become larger to subtend the same optical energy from the mirror. This may result in unacceptable high optical blockage and reduced efficiency. In some embodiments, the mirror prescription can be adjusted slightly to optimally locate the sub-reflector (e.g., at y=0.9 m) and maintain the RF prescription such that the focal length is at approximately y=105 cm (f/D=0.35) in this example. The 15 cm separation may reduce the direct sub-reflector blockage and minimize the angle subtended by the support tube, thereby minimizing blockage.

Figure 15:
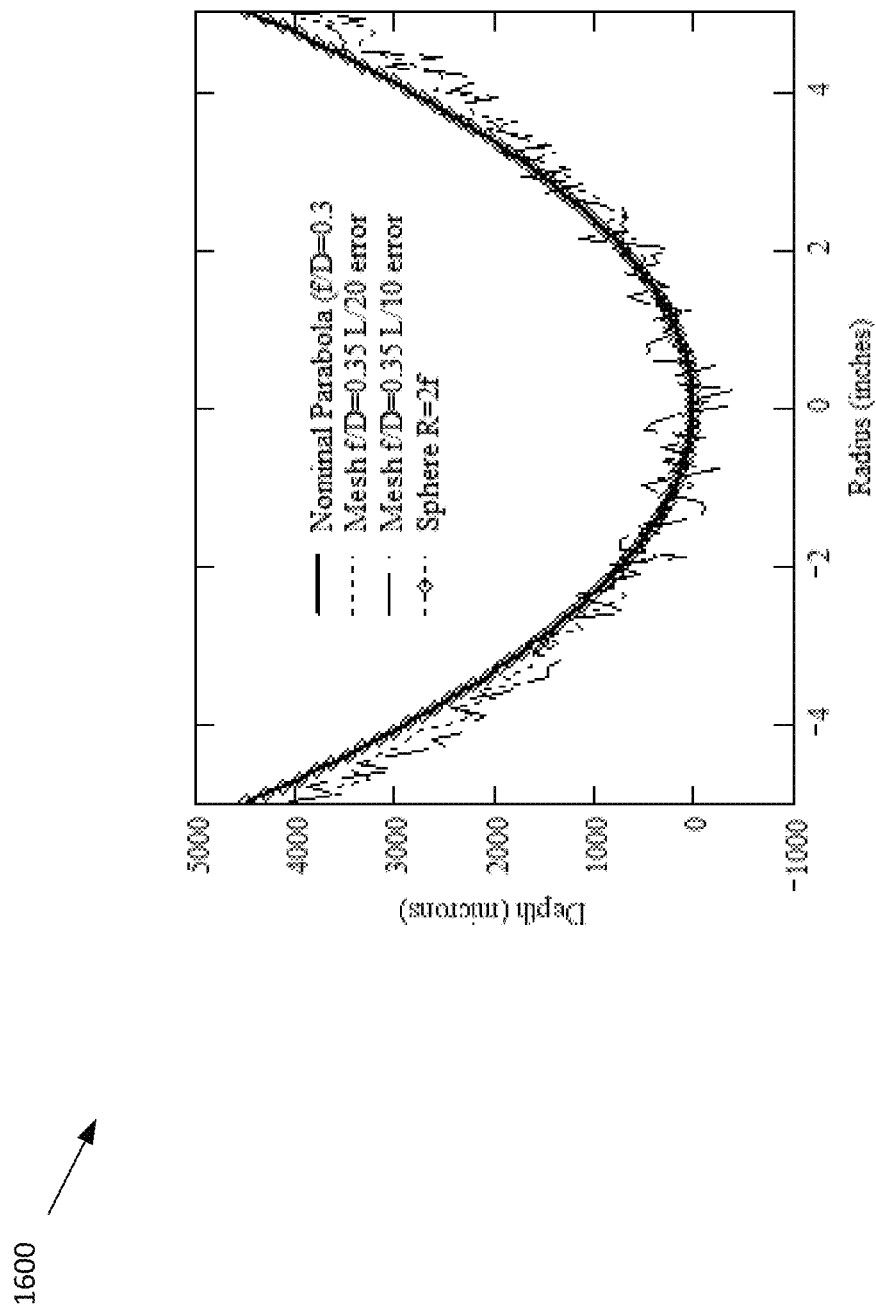
FIG. 15 is a graph illustrating how the mirror prescription can be modified to shorten the tube height without adversely affecting the RF performance, according to an embodiment of the present invention.

FIG. 15 is a graph 1500 illustrating how the mirror prescription can be modified to shorten the tube height without adversely affecting the RF performance, according to an embodiment of the present invention. Specifically, graph 1500 shows that for a typical $\lambda/20$ to $\lambda/10$ RMS RF reflector surface error, a mirror with a slightly different prescription to optimally locate the sub-reflector can be used and may still fall within the nominal overall prescription.

RF Transparent Bragg Sub-Reflector

In some embodiments, the sub-reflector may include an 11 layer stack-up of rutile (e.g., approximately 158 nm thick) and silica (e.g., approximately 269 nm thick) fabricated by pulsed laser deposition. Since the sub-reflector sits in front of a 32 GHz feed, the sub-reflector may need to be transparent for microwave wavelengths.

Figure 16:
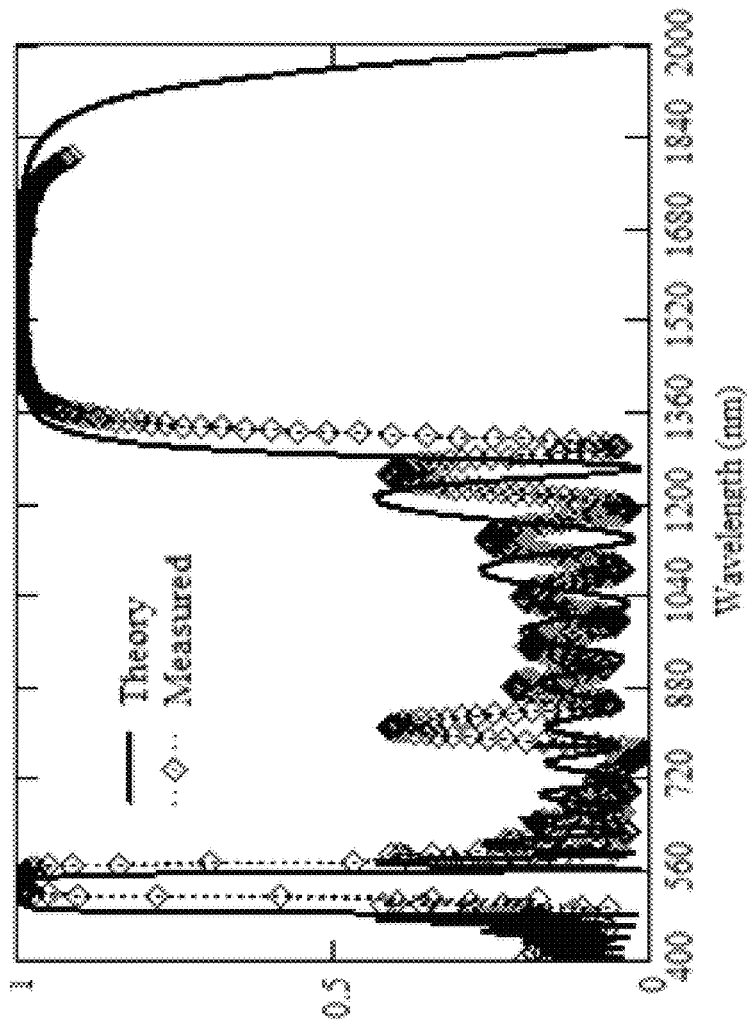
FIG. 16 is a graph illustrating a measured response versus theoretical response of a prototype RF transparent mirror, according to an embodiment of the present invention.

FIG. 16 is a graph 1600 illustrating a measured versus theoretical response of a prototype RF transparent mirror, according to an embodiment of the present invention. The measured performance of the dielectric stack-up reflector closely matches the theoretical calculation. The dielectric sub-reflector is fabricated on a low-dielectric substrate that is one-half wavelength thick at the center operating frequency so as to be transparent. The sub-reflector dielectric layer stack-up can be formed on a surface that is an axially displaced ellipse (ADE). The key advantage of the ADE is complete elimination of sub-reflector obscuration. For example, a conventional sub-reflector that has a diameter of 10%, 25% and 50% of the main reflector would cause a blockage efficiency loss of about 10%, 20% and 60%, respectively.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus that combines an antenna and telescope to minimize system mass without comprising performance of either the antenna or telescope, the apparatus comprising:
   a radio frequency (RF) reflector configured for rigid attachment to a body of a spacecraft, the RF reflector being characterized by an inner rim defining a void:
   a plurality of struts, each strut having a first end and a second end, the first end coupled to the RF reflector and the second end coupled to a prime focus RF feed of a hybrid reflector system, the prime focus feed being located at a focal point;
   an optical mirror co-located around a vertex of the RF reflector, the mirror having an outer rim, such that under operational conditions of the apparatus, a gap is defined between the inner rim of the RF reflector and the outer rim of the mirror to allow structural and thermal separation without affecting antenna performance, wherein the mirror is attached to a vibration isolation platforms; and
   a plurality of sub-reflector support tubes, each having a first end and a second end, the first end being connected to the mirror and the second end connected to a sub-reflector, wherein the sub-reflector is placed closer to the mirror than the prime focus RF feed.

2. The apparatus of claim 1, wherein the sub-reflector is transparent to microwave radiation.

3. The apparatus of claim 1, wherein one of the struts itself is configured to act as a waveguide transmission line.

4. The apparatus of claim 3, wherein the struts reduce one or more kilograms from the apparatus by acting as a structural support member.

5. The apparatus of claim 1, wherein the optical mirror comprises a slightly increased curvature with respect to the RF reflector, while allowing the mirror to contribute substantially to the RF reflector performance.

6. The apparatus of claim 5, wherein the curvature of the mirror is increased depending on an f/D of 0.3 prescription, reducing the focal length from 105 cm to 90 cm compared to an original f/D of 0.35 prescription.

7. The apparatus of claim 6, wherein the curvature of the mirror creates a shorter optical focal length to allow the sub reflector to be placed closer to a vertex, thereby allowing a reduced support tube length and thereby increasing a first structural mode to reduce jitter.

8. The apparatus of claim 1, wherein the support tubes comprise silicon carbide (SiC) having a dopant controlling electrical conductivity of the SiC to create a doped SiC, the doped SiC being transparent to microwave frequencies, and exhibiting a reduced electrical conductivity from about 20 S/m to less than 1 S/m, rendering the SiC acceptable as a telescope support tube material without compromising radio frequency performance.

9. An apparatus that combines an antenna and telescope to minimize system mass without compromising performance of either the antenna or telescope, the apparatus comprising:
   a radio frequency (RF) reflector configured for rigid attachment to a body of a spacecraft the RF reflector being characterized by an inner rim defining a void;
   a plurality of struts, each strut having a first end and a second end, the first end coupled to the RF reflector and the second end coupled to a prime focus RF feed of a hybrid reflector system, the prime focus feed being located at a focal point;
   an optical mirror co-located around a vertex of the RF reflector: and
   at least one sub-reflector support tube having a first end and a second end, the first end being connected to the mirror and the second end connected to a sub-reflector, wherein the sub reflector is placed closer to the mirror than the prime focus RF feed, wherein the at least one support tube comprises silicon carbide (SiC) having a dopant controlling electrical conductivity of the SiC to create a doped SiC the doped SiC being transparent to microwave frequencies, and exhibiting a reduced electrical conductivity from about 20 S/m to less than 1 S/m thereby the doped SiC is acceptable as a telescope support tube material without compromising radio frequency performance.

10. The apparatus of claim 9, wherein one of the struts itself is configured to act as a waveguide transmission line.

11. The apparatus of claim 10, wherein the struts reduce one or more kilograms from the apparatus by acting as a structural support member.

12. The apparatus of claim 9, wherein the mirror comprises an outer rim, such that under operational conditions of the apparatus, a gap is defined between the inner rim of the RF reflector and the outer rim of the mirror to allow structural and thermal separation without affecting antenna performance, wherein the mirror is attached to a vibration isolation platform; and the optical mirror comprises a slightly increased curvature as compared to the RF reflector while allowing the optical mirror to contribute substantially to the RF reflector performance.

13. The apparatus of claim 12, wherein the curvature of the mirror is increased depending on an f/D of 0.3 prescription, reducing the focal length from 105 cm to 90 cm compared to an original f/D of 0.35 prescription.

14. The apparatus of claim 13, wherein the curvature creates a shorter optical focal length to allow a sub-reflector to be placed closer to the vertex reducing support tube length and thereby increasing a first structural mode to reduce jitter.

15. The apparatus of claim 9, wherein the at least one sub-reflector support tube comprises three support tubes.

16. The apparatus of claim 9, wherein the at least one sub-reflector support tube consists of a single support tube.

17. An apparatus that combines an antenna and telescope to minimize system mass without compromising performance of either the antenna or telescope, the apparatus comprising:
   a radio frequency (RF) reflector configured for rigid attachment to a body of a spacecraft, the RF reflector being characterized by an inner rim defining a void;
   a plurality of struts, each strut having a first end and a second end, the first end coupled to the RF reflector and the second end coupled to a prime focus RF feed of a hybrid reflector system, the prime focus feed being located at a focal point,
   wherein one of the struts, itself, is configured to act as a waveguide transmission line;
   an optical mirror co-located around a vertex of the RF reflector, the mirror having an outer rim, such that under operational conditions of the apparatus, a gap is defined between the inner rim of the RF reflector and the outer rim of the mirror to allow structural and thermal separation without affecting antenna performance; and a plurality of sub-reflector support tubes, each having a first end and a second end, the first end being connected to the mirror and the second end connected to a sub-reflector, wherein the sub-reflector is placed closer to the mirror than the prime focus RF feed.

\* \* \* \* \*